UNITED STATES PATENT OFFICE.

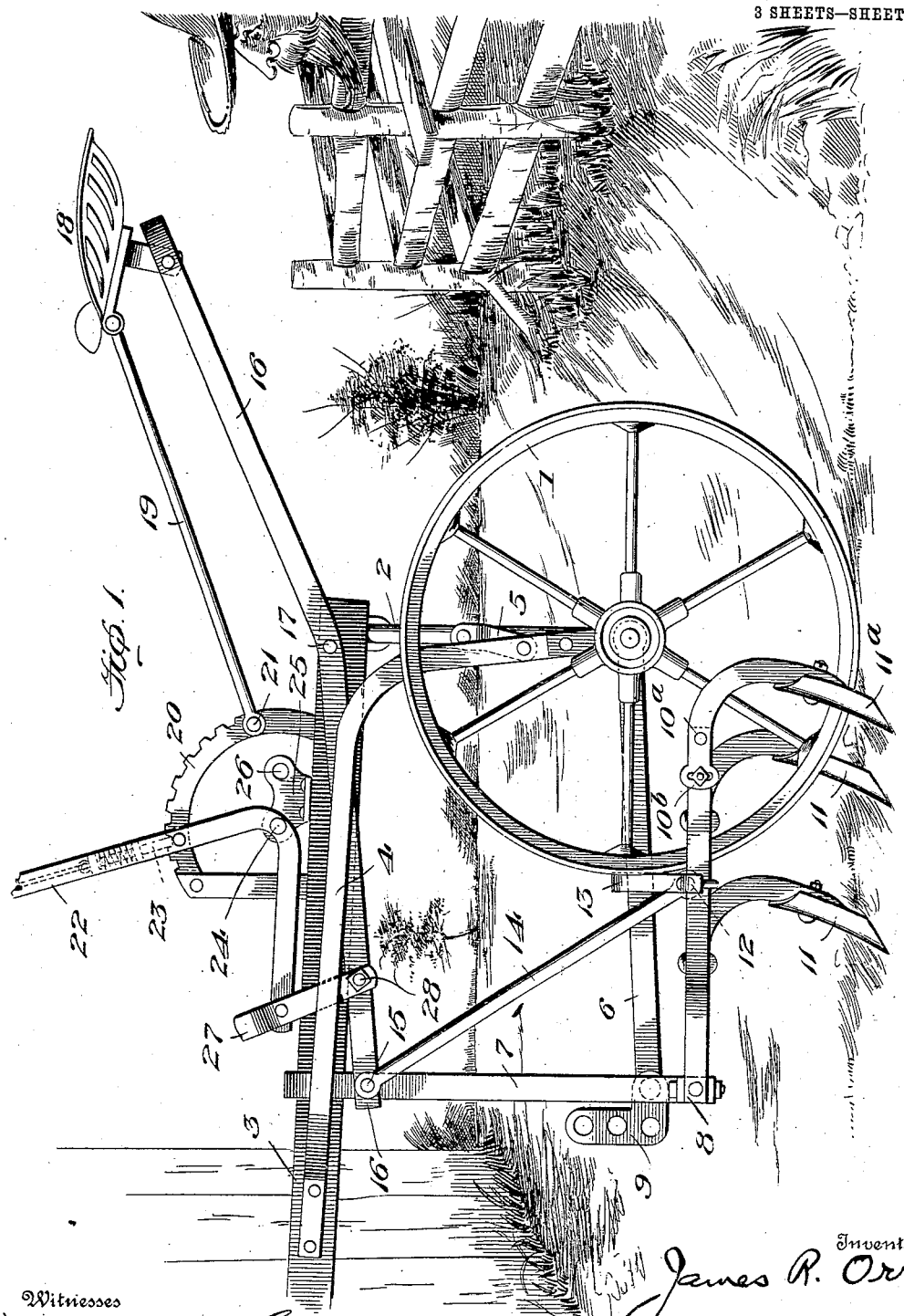

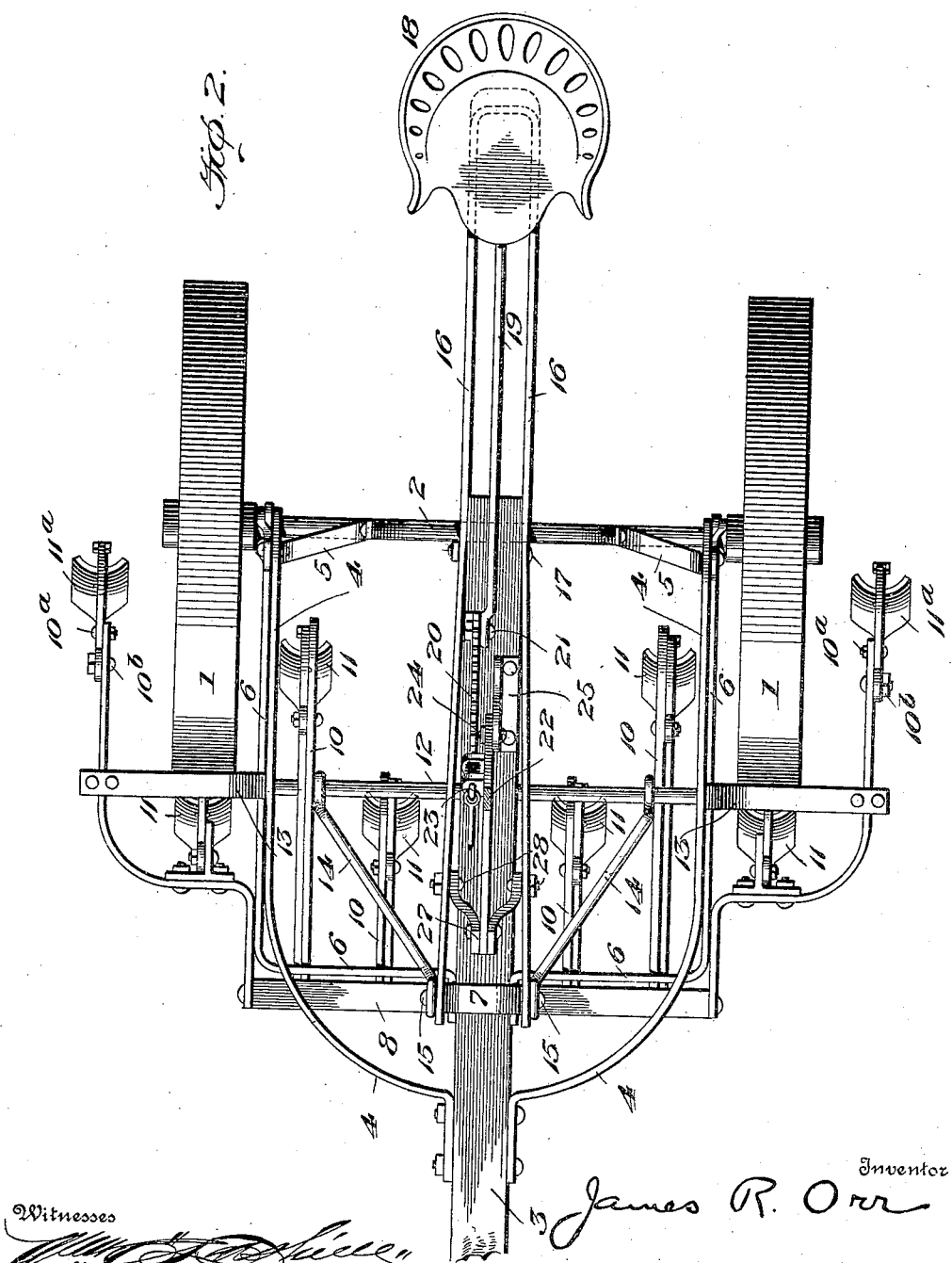

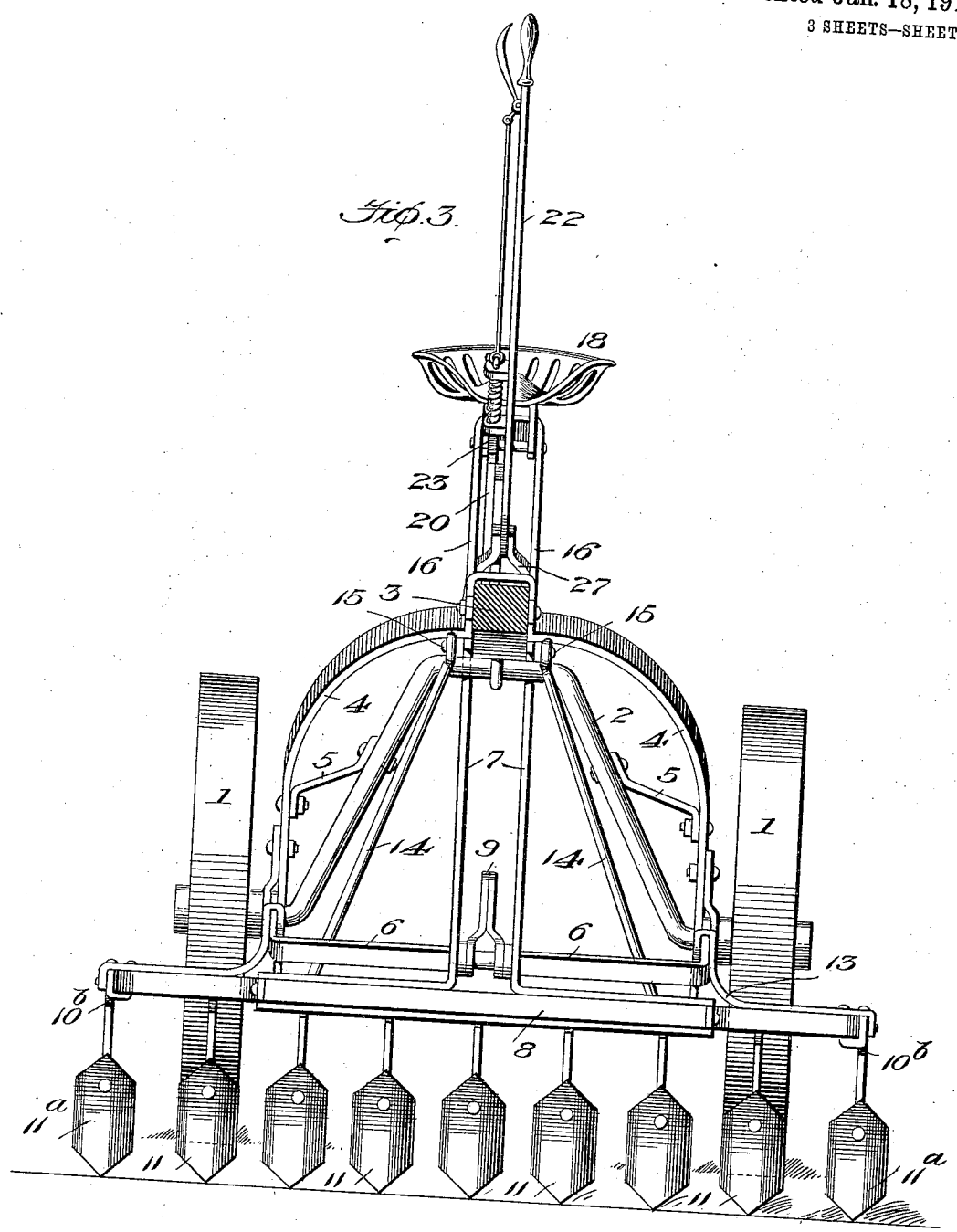

JAMES R. ORR, OF FRESNO, CALIFORNIA.

WHEELED CULTIVATOR.

946,644.  Specification of Letters Patent.  Patented Jan. 18, 1910.

Application filed April 27, 1909. Serial No. 492,586.

*To all whom it may concern:*

Be it known that I, JAMES R. ORR, a citizen of the United States, residing at Fresno, county of Fresno, and State of California, have invented certain new and useful Improvements in Wheeled Cultivators, of which the following is a specification.

My invention relates to wheeled cultivators.

The object of the present invention is the provision of a wheeled cultivator, particularly adapted for cultivation in vineyards and orchards, although susceptible of ordinary cultivating uses, wherein the shovels will be positioned in a new manner in relation to the wheels so that the wheels will be prevented from running over vines which are growing out into the rows, as well as preventing the driver from dropping into the furrows before the furrow has been opened, and so that when the driver turns the cultivator to the right or left, the shovels will be moved from the growing object which is being cultivated; wherein the shovels and the driver's support will be arranged so that they will mutually substantially balance each other and both will remain level at all times, to provide a novel construction permitting adjustment of the parts in a new manner.

The invention is fully set forth hereinafter and its novel features are recited in the appended claims.

In the accompanying drawings:—Figure 1 is a side elevation; Fig. 2, a plan view; and Fig. 3, a front elevation with the beam or pole in section.

The traction wheels 1 are mounted on an arched axle 2, which is secured to the beam or pole 3. Braces 4 connect the beam or pole 3 to the axles adjacent the hubs of the wheels and said braces are connected to the arched part of the axle 2 by short braces 5.

Having their rear ends journaled on the axle are horizontal frame-pieces 6 whose forward ends are connected to a vertically extending guide-frame 7, which straddles the beam or pole 3 and affords a guide to prevent lateral shifting of the parts connected thereto and suspended therefrom, said guide-frame rising from and being connected to a cross-piece 8. A clevis 9 is secured to the guide-frame 7. The cross-piece 8 carries the beams 10 of the cultivator shovels 11, all of said shovels lying in advance of the axles of the wheels 1 for a purpose which will be presently explained.

Two of the shovels 11ª lie outside the wheels 1. The shovels are made adjustable by the provision of the pivots 10ª and locking means 10ᵇ, whereby the shovels may be tilted to different desired angles of inclination and thus the depth of the furrows regulated. The shovels located between the wheels are cross-connected by a rod 12 so that they are braced laterally and the outermost ones of said inner shovels are provided with hooks 13 which are adapted to straddle and rest upon the frames 6 when the shovels are in normal position, whereby the weight of said shovels is sustained by said frames 6 and in turn by the upright guide-frame 7 from the beam 3, but braces 14, leading from the cross-rod 12 to upper parts of the guide-frame 7, at 15, where they are pivoted, additionally strengthen the frame construction and support the shovel beams.

A pair of levers 16 which are pivoted to the beam 3 at 17, have their front ends connected to the pivots 15. The rear ends of these levers support a pivotally mounted seat 18 which is connected by a rod 19 to a curved rack 20 at 21, said connection 21 being pivotal as also the connection of the rod 19 to the seat 18. The rear arm of the lever 16 and the rod 19, together with the pivots 17, 21, etc., constitute a parallel rule construction, whereby the seat is always maintained in level position, regardless of the elevation or depression of the levers 16. Now, inasmuch as the levers 16 are connected to the guide-frame 7, and the frames 6 are substantially parallel to the fore-arms of the levers 16, there is provided another parallel rule construction which, in consequence of the use of the supporting rods 14, causes the cultivator beams to always lie in a general horizontal direction and thus at all times the seat and the cultivator beams are kept level, regardless of the elevation or depression thereof. Furthermore, the construction causes the weight of the driver to substantially balance the weight of the cultivator beams, and thus the amount of energy required to raise or lower the cultivator beams is very small, and hence all adjustments may be had very easily from the driver's seat. For purposes of adjustment there is conveniently provided a lever 22 having a latch 23 to engage the ratchet 20, the lever being pivoted at 24 to a bracket 25 carried by beam 3, said bracket having additional pivot holes 26, as desired, the forward end of the lever being pivoted to a yoke 27 whose arms are pivoted at 28 to the fore-arms of the levers 16. The driver can conveniently operate the lever 22 to position the cultivator shovels at any desired height, his own seat being raised or lowered accordingly.

The traction wheels being behind and on the inside of the outermost shovels 11ª, the said wheels are prevented from running over the vines that are growing out into the rows, assuming that the cultivator is used where there are growing vines, and the entire gang of cultivator shovels being in front of the wheels, when the driver pulls the team to the right or left, the shovels are moved to or from the object which he is cultivating, whereas with shovels which are placed in the rear of the wheels, as has heretofore been the case, the turning of the cultivator will direct the shovels into the object being cultivated, to the damage thereof.

The arrangement of the parts whereby the driver's weight substantially balances the cultivating devices, has the advantage of requiring but a slight amount of energy to raise or lower the shovels; the seat and shovels are always disposed substantially horizontally, and the positioning of the parts is readily accomplished.

Having thus described my invention, what I claim as new and desire to secure by Letters Patent, is:—

1. In a cultivator, the combination with the axle, of a frame pivoted to the axle and extending forwardly therefrom, cultivators which are pivoted to the forward part of said frame and which are provided with means, whereby their free rear parts may be suspended from said frame when the frame is lifted, a pivoted lever, a driver's seat carried by said lever on one side of its fulcrum, and connections between the lever on the opposite side of its fulcrum and the frame aforesaid, whereby the weight of the driver counterbalances the weight of the frame and the cultivators but said cultivators are left free to rise and fall.

2. In a cultivator, the combination with cultivating means, of a lever connected thereto on one side of its fulcrum, a driver's support pivotally connected to the said lever on the other side of its fulcrum, and a rod pivotally connected to the driver's support and to the cultivator frame, whereby the driver's support is maintained in substantially level position regardless of the position of the cultivating means.

3. In a cultivator, the combination with cultivating means, of a lever connected thereto on one side of its fulcrum, a driver's support pivotally connected to and supported by the said lever on the other side of its fulcrum, a rod pivotally connected to the driver's support and to the cultivator frame, whereby the driver's support is maintained in substantially level position regardless of the position of the cultivating means, and a hand-operated lever and locking means therefor for shifting and securing the lever first-named, whereby the cultivating means and driver's support are secured where adjusted.

In testimony whereof, I hereunto affix my signature in presence of two witnesses.

JAMES R. ORR.

Witnesses:
E. T. STOCKDALE,
D. U. BATES.